March 11, 1952　　R. E. RISLEY ET AL　　2,588,573
PIPE COUPLING
Filed June 10, 1949　　2 SHEETS—SHEET 1

INVENTORS
ROGER E. RISLEY
AND GEORGE D. KISH
BY
ATTORNEY.

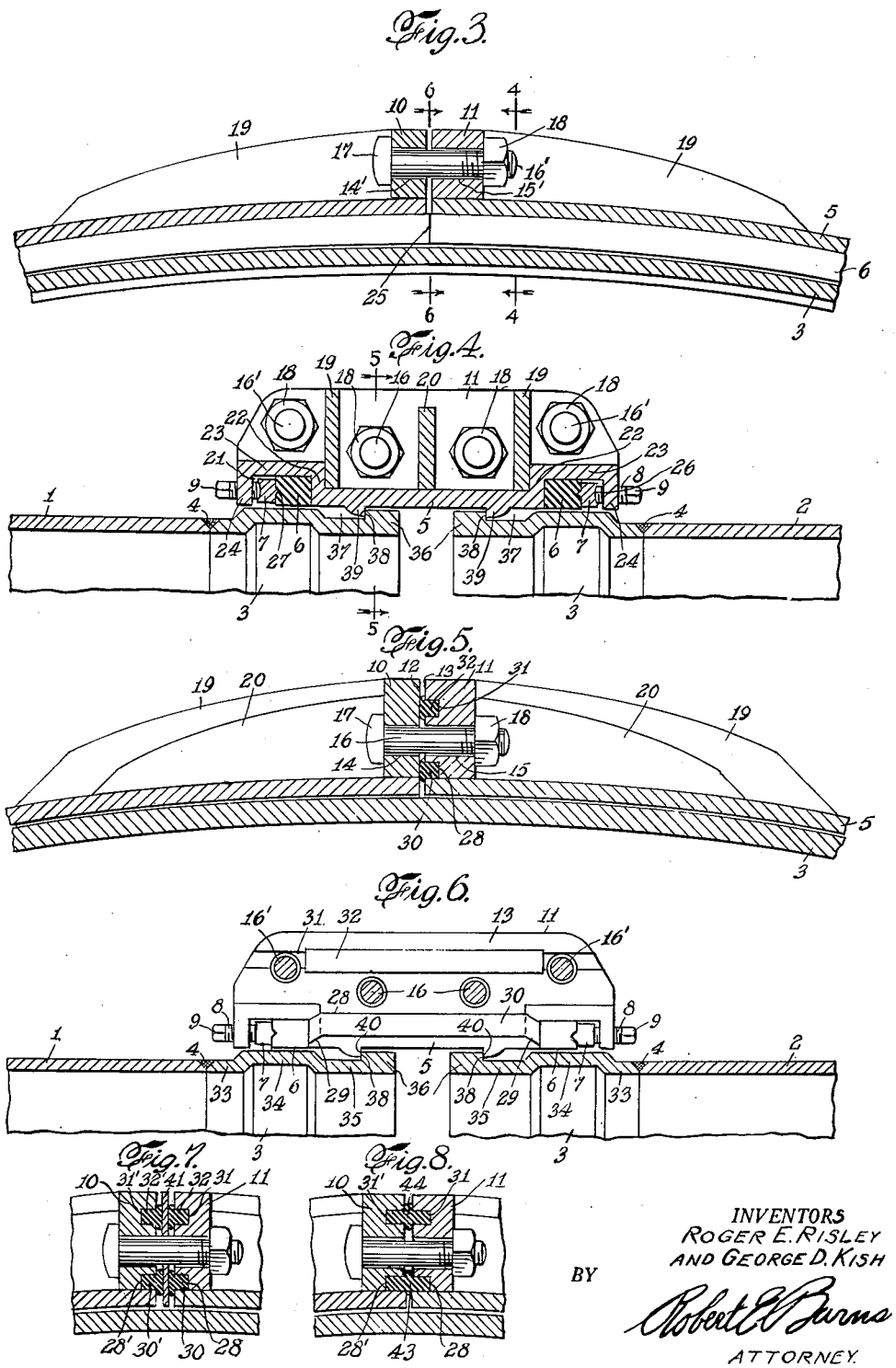

Patented Mar. 11, 1952

2,588,573

UNITED STATES PATENT OFFICE 2,588,573

PIPE COUPLING

Roger E. Risley and George D. Kish, Bradford, Pa., assignors to Dresser Industries, Inc., Cleveland, Ohio, a corporation of Pennsylvania Application June 10, 1949, Serial No. 98,298

12 Claims. (Cl. 285—129)

The present invention relates to gasket sealed pipe couplings and particularly to couplings for large diameter pipes. The expression "large diameter" generally refers to sizes approximately four feet and larger, although certain features of the invention are applicable to pipes of smaller sizes such as two or three feet in diameter.

In the manufacture of a suitable coupling for use on large diameter pipes, several difficulties arise. Large diameter pipe is customarily made in wall thicknesses which do not increase proportionately to the diameter insofar as structural strength and rigidity are concerned. Therefore, generally speaking, the greater the diameter the greater the tendency of the pipe to become distorted under given field conditions or even under the weight of the pipe itself. Furthermore, the manufacture of large diameter pipe involves serious problems in maintaining accuracy of size and roundness at the mill.

A further difficulty lies in the necessity to provide a clearance between the pipe and the coupling in order to make field assembly possible. This situation always results in a troublesome compromise because the clearance ordinarily required for practical field work adversely affect the clearance through which the gasket must not escape.

The described variations and irregularities in the size and shape of the pipe and the required clearance for assembling make it very difficult to obtain a dependable fluid-tight joint with the conventional type of pipe couplings.

It is an object of the present invention to provide a satisfactory and lasting fluid-tight pipe coupling for pipes having a large diameter in proportion to their wall thickness. Another object of our invention is to provide a pipe coupling which is easily assembled in the field and yet provides when assembled but a minimum clearance between the coupling and the pipe. Another object of our invention is to provide a coupling which is preassembled, arriving in the field with end gaskets, followers and tightening means in place on the coupling and ready to be used in making up the joint. Another object is to provide a coupling with an external coupling surface which may be easily coated. A further important object of our invention is to provide a pipe coupling having the above mentioned characteristics, and wherein the pipe is locked in the coupling.

In accordance with the present invention, the coupling comprises a flexible tubular sleeve split at one place transversely of its circumference, which provides sufficient clearance for an easy insertion of the pipe ends to be coupled and which may be drawn up tightly around the pipe after the insertion thereof. In this respect the flexible sleeve acts like a band which is drawn closely around the pipe, tending to conform to the shape thereof and leaving a minimum clearance. In accordance with the invention, this feature of a coupling split at one place furthermore makes it possible to provide a practical locking device between the pipe and the coupling by making the flexible tubular sleeve sufficiently expandable to permit the entering of the pipe until the locking device engages. The outer surface of the pipe ends must be provided to this effect with recesses or projections or the like cooperating with corresponding projections or recesses on the inner surface of the coupling. According to the invention it is found advantageous in many cases to provide end rings especially furnished for the purpose and to be shop-welded to the ends of the pipe sections to be coupled. These end rings can be manufactured in connection with the manufacture of the coupling itself and can be made with much greater accuracy as regards size and roundness than the pipe, whereby a close conformity of the mating parts is assured, which further enhances the effectiveness and tightness of the joint.

Other objects and advantages of our invention will appear from the following description and claims in conjunction with the accompanying drawings, which illustrate by way of example one embodiment of the invention.

In the drawings,

Figure 3 is a sectional view taken approximately on the line 3—3 of Figure 1;

Figure 4 is a sectional view taken approximately on the line 4—4 of Figure 3;

Figure 5 is a sectional view taken approximately on the line 5—5 of Figure 4;

Figure 6 is a sectional view taken approximately on the line 6—6 of Figure 3; and Figures 7 and 8 are sectional views similar to Figure 5 showing modifications of the sealing means at the split.

Figure 1:
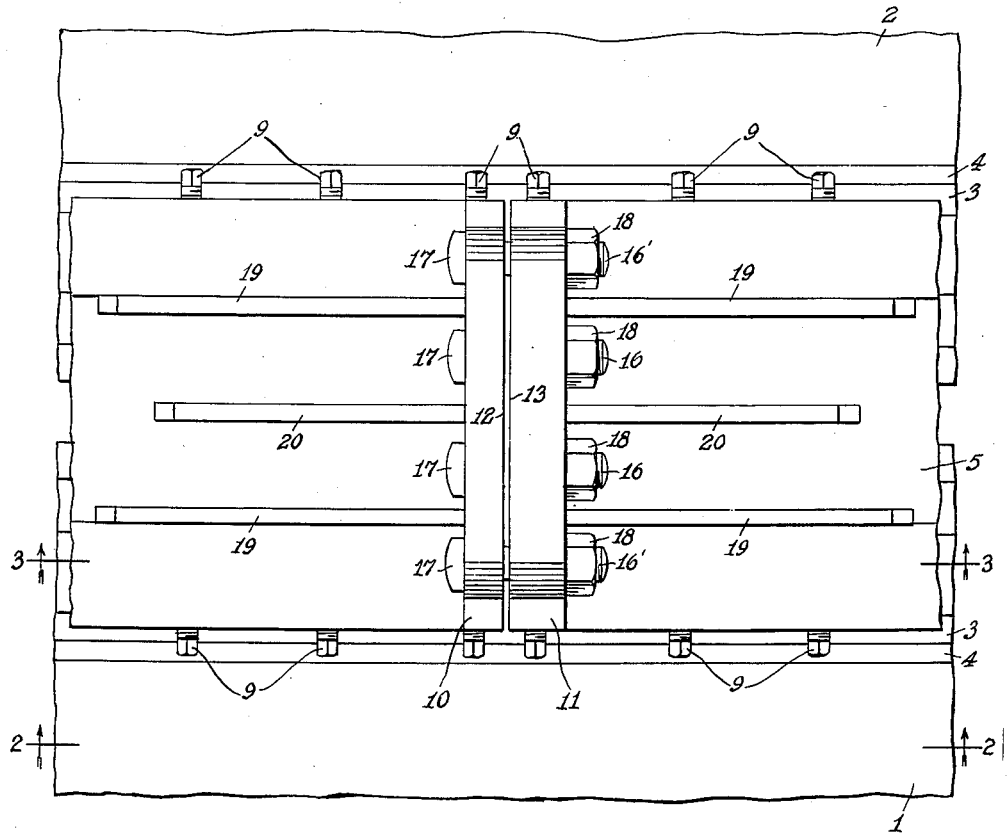
Figure 1 is a fragmentary plan view showing a coupling in accordance with my invention, applied to the adjoining ends of two pipe sections.

In the drawings a pipe coupling embodying my invention is shown as a coupling for joining the ends of two pipe sections of large diameter, the end portions 1 and 2 of the sections being shown to illustrate the way in which the coupling is applied to the pipe. Two end rings 3 are attached by welding joints 4 to these pipe section ends 1 and 2. The coupling comprises a tubular sleeve 5 extending around the end rings 3, two annular gaskets 6 positioned in two gasket recesses at both sides of the sleeve 5, two follower rings 7 adjacent these gaskets, and a plurality of bolts or set screws 8 with square heads 9, which bolts are intended to apply pressure to the follower rings 7.

The sleeve 5 is of flexible construction and is split at one place transversely of its circumference so that it may be expanded or contracted by drawing the split ends away or towards each other. By the expression "split transversely of its circumference" is meant that the sleeve may be split at approximately right angles to its circumference as shown in the drawings, or at such other angles as may be desired. Two cross bars 10, 11 are welded to the adjacent ends of the split sleeve, corresponding at the welding joints with the cross section thereof and forming two outwardly projecting flange-like portions with opposed flat faces 12, 13, respectively, lying flush with the cut ends of the sleeve. The cross bars 10, 11 are provided with aligned holes 14, 15 to receive tangential threaded bolts 16 with heads 17 and nuts 18 threaded thereon, which may be tightened to draw the cross bars toward one another, the bolt heads 17 lying against the outer side of the cross bar 10 and the nuts on the outer side of the cross bar 11. Although in the embodiment shown bolts and nuts are used, it will be understood that any equivalent fastening means may be used for drawing the cross bars together, such as stud bolts, cap screws, etc. Owing to the flexibility of the sleeve 5, it is thereby drawn in close conformity with the end rings 3, acting like a band which is drawn around the pipe, tending to fit closely the shape thereof. In this way the best conditions for a durable, tight sealing of the gaskets 6 on both sides of the sleeve will be obtained. Although in the embodiment shown the sleeve surrounds the end rings 3 welded to the ends of the pipe sections 1 and 2, these end rings may be left out, in which case the sleeve surrounds these pipe section ends themselves. The pipe ends are more liable to be out of round than the end rings because of the flexibility of the pipe wall or variations in manufacture, but the sleeve when drawn up tight by means of the bolts 16 tends to pull the two pipe ends into alignment and in closer conformity with each other. However, by using end rings welded to the pipe ends, an additional security for a dependable fluid-tight coupling is obtained because these end rings can be made with greater accuracy as to roundness and dimensions than the pipe and can be given a greater wall thickness or otherwise be strengthened. Moreover, the manufacture of the end rings 3 may be undertaken in connection with the manufacture of the coupling itself, thereby assuring that the circumferential length of the mating parts closely conform. The dimensions of the sleeve can in this way easily be made such that when drawn up the sleeve fits the end rings with a minimum of clearance and the opposing faces 12, 13 of the cross bars 10, 11 lie in close proximity to each other. This latter feature is of importance in connection with the sealing of the transverse split of the sleeve, as will be described later on.

To avoid concentration of stresses and local distortion of the sleeve by the bending moment imposed by the hold of the tangential bolts 16 on the cross bars 10, 11, and to secure the parallelism of the faces 12 and 13 when the cross bars are drawn up, there are preferably provided a number of webs or gussets 19, 20 which extend rearwardly from the cross bars 10, 11 and project outwardly from the sleeve being united with the cross bars and the body portion of the sleeve, for example by welding. The three gussets shown distribute the stresses resulting from the pull of the bolts on the cross bars and prevent distortion of the end portions of the sleeve.

The arrangement of the sealing means on both sides of the sleeve 5 is preferably of the same kind as the sealing arrangement shown and described in my co-pending application, Serial No. 42,219, for a non-split pipe coupling. Thus both sides of the sleeve are formed into a shape of channel-like cross section providing two inwardly facing annular recesses or channels 21 of uniform width and depth and bounded by an outwardly projecting inner flange 22, an outer flange 24, both perpendicular to the axis of the coupling, and a cylindrical wall 23 (Figure 4).

The cross bars 10 and 11 welded to the sleeve are cut to conform to the cross sectional shape thereof and extend sideways over the channel walls 23. The two outer gussets 19 are welded to the outside of the channel flanges 22 and have a greater height than the middle gusset 20. The two outside bolts 16' in the cross bar holes 14', 15', are situated above the channels 21 and the two inner bolts 16 in the holes 14, 15 lie between the gussets 19, 20 at a smaller distance from the axis of the coupling than the outside bolts.

The gaskets or packing rings 6 are made of rubber or other suitable material molded in ring form or in the form of a strap having a rectangular cross section. As shown, a gasket 6 is placed in each channel 21 adjacent the flange 22 and the cylindrical wall 23, the diameter of the cylindrical inner surface of the gasket being slightly greater than the diameter of the outer surface of the end rings 3. The gaskets are split in one place as indicated at 25 in Figure 3 to form a sealing butt joint when compressed. The follower rings 7 are situated in the channels 21 adjacent the annular outer surface of the gaskets and adapted to compress the gaskets between the flange 22, the wall 23, and an end ring 3, to seal the clearance between the sleeve and the end rings.

The follower rings are sectional or split, for instance at the same place 25 as the gasket, to facilitate insertion into the channels 21, and to allow expansion and compression thereof together with the sleeve 5.

The outer flange 24 of the channel 21 is provided with a plurality of threaded apertures receiving the set screws 8 which project with their ends inside the channel engaging the follower rings 7. Sealing pressure may thus be applied to the rings and gaskets by tightening the set screws 8 by means of a wrench placed over the square heads 9.

As described in the co-pending application, Serial No. 42,219, this arrangement of the gasket and follower rings in the sleeve has among others the advantage that the set screws do not penetrate the gaskets and yet are situated close to the pipe surface whereby on the one hand the gasket flow is not impeded, and on the other hand no severe turning moments occur in the clamping parts. In the embodiment shown the diameter of the end rings is greater than the pipe diameter so that ample wrench movement for the set screw is available, although they are situated very close to the inner circumferential perimeter of the coupling.

Figure 2:
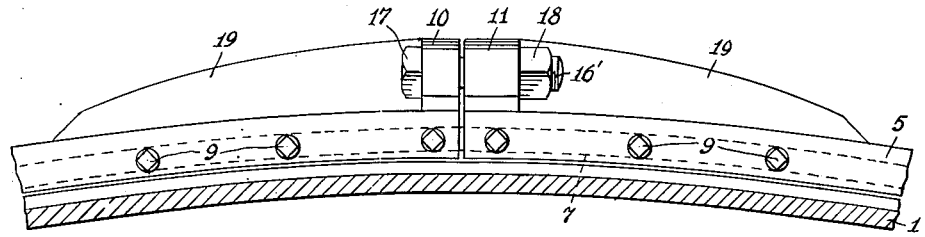
Figure 2 is a sectional view taken approximately on the line 2—2 of Figure 1.

The outer side of the follower rings is provided with an annular screw end receiving recess 26 (Figure 4) to secure a coaxial position of the rings in the channel under all circumstances. On their inner side the rings 7 are provided with a circular projection of preferably V-shaped cross section fitting into a circular groove in the outer surface of the gaskets 6, as indicated at 27 (Figure 4). These or equivalent inter-engaging means between the set screws, follower rings and gaskets serve the purpose of preventing the several split parts from falling out of the coupling during shipment and installation, and furthermore makes these parts follow any expending and retracting movements imparted to the sleeve in the course of the inserting of the end rings and the subsequent drawing up of the coupling. Preferably the follower rings are somewhat elastic and lie in the channel with a slight radial tension, tending to expand radially with respect to the channel wall 22. The gaskets and follower rings may be placed in the channel 21 in such a way that their splits and the split in the sleeve do not coincide. To simplify factory assembly work and installation in the field, the follower and gasket splits are, however, preferably placed in alignment with the split in the sleeve as shown, the two set screws 8 at either side of the split in the sleeve, which engage the split ends of the follower, being placed close to each other as appears from Figure 2.

To provide a fluid-tight seal at the split in the sleeve 5, gasket sealing means may be placed between the opposed faces 12 and 13 of the cross bars 10 and 11 to be pressed into sealing engagement with these faces when the cross bars are drawn up by the tightening of the bolts 16. These gasket sealing means must at both sides join with the annular gaskets 6 in order to insure a tight seal over the whole length of the split.

In accordance with the invention this split seal is obtained by providing at least one continuous transverse groove in one or both of the opposing faces of the cross bars and the split ends of the sleeve, extending from the one channel 21 to the other and by placing a strap-like gasket cut to length in this groove.

In the embodiment shown in Figures 5 and 6 a groove 28 of rectangular cross section is cut away in the face 13 of the cross bar 11 at the underside thereof adjacent the sleeve 5 (Figure 6). Two short cross grooves 29 are provided in the end surface of the flanges 23, which grooves 29 form a continuation of the groove 28 sloping inwardly from the ends thereof to open in the channels 21. A strap-like gasket 30 is placed in this groove 28—29, having a thickness exceeding the depth of the groove, so that it is pressed into sealing engagement with the opposed face 12 of the cross bar 10 when the two cross bars 10 and 11 are drawn up, as shown in the cross section of Figure 5. The butt ends of the gasket 30 lie flat against the two gaskets 6 in the channels 21 and form a sealing joint therewith. By placing the gasket 30 in the groove 28 it is prevented from being blown out by the internal pressure in the pipe.

A second cross groove 31 of rectangular cross section is provided in the face 13 of the cross bar 11 near the upper side thereof, in which groove 31 a gasket 32 is placed in a similar way as the gasket 30 in the groove 28. The gasket 32 is also pressed against the face 12 of the cross bar 10 when the two cross bars are drawn up, but it does not serve any sealing purpose. This gasket 32 is incorporated in the coupling to balance the relationship of the two cross bars 10, 11 when the split is being drawn together and prevents heeling over of the cross bars, which might tend to open the coupling clearance at the extremities of the gussets 19, 20. As the groove 31 crosses the bolt holes 15' in the cross bar 11, the gasket 32 does not extend across the whole length of the cross bar but only over the part of the groove between the two holes 15', which is sufficient for the purpose it serves. Although the grooves shown have a rectangular cross section they may also be V-shaped or have any other convenient cross-sectional shape.

Under special circumstances the circumferential length of the coupling may be adjusted by introducing a shim of the desired thickness between the cross bars. In this case both cross bars may be grooved and fitted with strap-like gaskets with the shim introduced in between, as shown in Figure 7. The cross bar 10 has grooves 28' and 31' with gaskets 30' and 32' placed therein similar to and opposite the grooves 28 and 31 with gaskets 30 and 32 respectively in the cross bar 11. An adjusting shim 41 of the required thickness is placed between the cross bars and is pressed between the respective gaskets on either side thereof to seal the split. The necessity for this adjustment may occur for instance if no end rings 3 are used and if the diameter of the pipe for some reason is too great to adequately fit the coupling.

In the modification shown in Figure 8, both cross bars 10 and 11 are provided with grooves 28, 31, and 28' and 31', respectively, similar to Figure 7. No shim being placed between the bars, however, strap-like gaskets 43 and 44 are provided having a thickness greater than twice the depth of one groove, so that, when placed in the grooves of one of the cross bars, they are pressed into sealing engagement with the opposite grooves in the other cross bar when the coupling is drawn up.

According to the invention, the feature of the split and flexible coupling may be capitalized on by providing locking means between the coupling and the pipe ends or the end rings welded thereto, and by making the coupling sufficiently expandable to permit the entering of the pipe ends therein until these locking means inter-engage. These locking means may comprise cooperating recesses and projections of any convenient form provided at the inner surface of the coupling sleeve and the outer surface of the pipe ends. Preferably, end rings are used welded to the pipe ends to be coupled, which end rings are provided with their part of the locking means. In this way the end rings can be manufactured in connection with the coupling whereby the shape and dimensions of the respective inter-engaging parts of the locking means can be more easily controlled to assure an accurate fitting of these parts.

In the embodiment shown, the end rings 3, machined or rolled in one piece, have for the greater part approximately the same wall thickness as the pipe and comprise several cylindrical portions. These portions are: a short welding end portion 33 having the same diameter as the pipe end it is welded to at 4, a portion 34 with a greater diameter than the pipe end serving as the sealing surface for the annular gasket 6, a portion 35 having approximately the same dimensions as the pipe, and an end portion 36 of greater wall thickness, having the same outside diameter as the portion 34 and the same inner diameter as the portion 35. In this way annular groove 37 is formed on the outer surface of the end rings, which groove is bounded toward the inner side of the coupling by the jutting-out portion 36 forming an annular surface 38 perpendicular to the axis of the coupling.

The cylindrical inner surface of the sleeve 5 fits closely around the portions 38 when the sleeve ends are drawn up and is provided with two annular projections or lips 39 adapted to engage the grooves 37 in the end rings 3. The lips 39 are bounded at their inner side by an annular surface 40 perpendicular to the axis of the coupling and corresponding to the surface 38 of the portion 36. Thus when the surfaces 38 and 40 engage as shown in Figure 4 the end rings cannot be pulled out of the sleeve and are locked therein. The groove 37 has a greater width than the lip 39 so as to allow some movement of the end rings in the sleeve and also to allow some deflection of the end rings with respect to the sleeve. The portion 34 has been given sufficient width to assure sealing engagement thereof with the annular gasket 6 in any position of the lip 39 in the groove.

In addition to the possibility for pipe deflection provided by the side groove 37, pipe deflection may be easily obtained by welding the end rings 3 to the pipe section ends 1, 2 at an angle. For this purpose the portions 33 of the end rings may be extended and formed in such a way that they fit the pipe ends at the desired angle.

The end rings 3 formed as described above have a relatively great rigidity, which, in addition to the flexibility of the band-like sleeve 5, assures a close fit of the mating parts, and a tight sealing.

With the exception of the cross bars 10, 11, and gaskets 19, 20, the exterior of the coupling presents a smooth surface which reduces the difficulty of applying a field coating to the coupling. A further advantage of the pipe coupling shown is that the sealing means lie confined in the channels 21 and are effectively protected by the outer flange 24.

To install the pipe coupling according to my invention, the sleeve, with the several parts of the coupling loosely assembled therein, is first expanded by moving the cross bars away from each other to such an extent that sufficient clearance is provided to allow the pipe ends or the end rings previously shop-welded thereto to be freely entered in the sleeve and the end portions 36 to be moved past the lips 39 until the latter lie opposite the groove 37. The nuts 18 on the tangential bolts 16 are then tightened to draw the sleeve closely around the end rings with the lips 39 engaging the groove 37, thus inter-locking the sleeve and the end rings. As the cross bars 10, 11 are drawn toward each other, the gaskets 30, 32 are compressed between them, the gasket 31 thereby sealing the split in the sleeve. When the sleeve is fully adjusted, the set screws 8 are tightened to apply sealing pressure to the annular gaskets 6.

What we claim and desire to secure by Letters Patent is:

1. In a pipe coupling for coupling the ends of two pipe sections, a flexible tubular member split at one place transversely of its circumference, and provided at its adjacent split ends with opposed outwardly projecting flange portions, said tubular member on its inner surface and said pipe ends on their outer surface being provided with cooperating recesses and projections for inter-locking said tubular member and said pipe ends, means for drawing said end portions toward one another to draw said tubular member into close conformity and locking engagement with the pipe end surfaces, and gasket sealing means disposed between said flange portions for sealing the transverse split in said tubular member when the flange portions are drawn up.

2. In a pipe coupling for coupling the ends of two pipe sections, a flexible tubular member split at one transversely of its circumference, and provided at its adjacent split ends with opposite outwardly projecting flange portions, said pipe ends having at their outer surface an annular groove, and said tubular member having at its inner surface two spaced ring-like inward projections adapted for locking engagement with said annular grooves, said tubular member being expandable so as to permit the entering of the pipe ends therein past said ring-like projections until the latter engage said annular grooves, means for drawing said end portions toward one another to draw said tubular member into close conformity with the surface shape of said locked pipe ends, and a gasket disposed between said flange portions and adapted to be pressed into sealing engagement with said flange portions of said tubular member.

3. In a pipe coupling for coupling the ends of two pipe sections, a flexible tubular member split at one place transversely of its circumference and provided at its adjacent split ends with opposed outwardly projecting flange portions, said tubular member having at both sides an inward facing annular recess, and at its inner surface two spaced ring-like projections positioned between said two recesses, said pipe ends having at their outer surface an annular groove adapted to be engaged by said ring-like necessary number of flat planks will permit the inward projections for interlocking said tubular member and said pipe ends, means for drawing said flange portions toward one another to draw said tubular member into close conformity with the surface shape of said pipe ends, a transverse gasket positioned between said opposed flanged portions and extending transversely from the one annular side recess of said tubular member to the other, said gasket being pressed into sealing engagement with said flange portions upon the drawing together of the latter, split annular gaskets positioned within said recesses, split follower rings positioned adjacent said gaskets, and means for urging said follower rings against said annular gaskets to press said gaskets into sealing engagement with said tubular member and said pipe ends.

4. In a pipe coupling, two end rings attached to the ends of the pipe sections to be coupled, a flexible tubular member split at one place transversely of its circumference, thus forming two opposed end portions, said tubular member on its inner surface and said end rings on their outer surfaces being provided with cooperating recesses and projections for inter-locking said tubular member and said end rings, means for drawing said end portions toward one another to draw said tubular member into close conformity and locking engagement with the end ring surfaces, and gasket sealing means for sealing the transverse split in said tubular member when the end portions thereof are drawn up.

5. In a pipe coupling comprising two end rings attached to the ends of the pipe sections to be coupled, said end rings having an outer diameter larger than that of the pipe and having an annular groove in their outer surface, a flexible tubular member split at one place transversely of its circumference, thus forming two opposed end portions, said tubular member at its cylindrical inner surface being provided with two spaced annular inward projections adapted to engage said annular grooves in said end rings for inter-locking said tubular member and said end rings, said tubular member being expandable to permit the entering of said end rings therein past said annular projections until the latter engage said grooves, said grooves having a greater width than said projections to allow for some deflection between the tubular member and the respective pipe ends, means for drawing said end portions toward one another to draw said tubular member around the end rings with a minimum clearance, and a gasket adapted to be pressed into sealing engagement with said end portions when the latter are drawn up.

6. A pipe coupling comprising two end rings to be welded to the ends of the pipe sections to be coupled, said end rings each having an annular groove in their outer surface, a flexible tubular member split at one place transversely of its circumference and provided at its adjacent split ends with opposed outwardly projecting flange portions, said tubular member having at both sides an inwardly facing annular recess and at its inner surface two spaced ring-like inward projections positioned between said recesses and adapted to engage said annular grooves for inter-locking said tubular member and said end rings, said tubular member being expandable to permit the entering of said end rings therein past said ring-like projections until the latter engage said grooves, means for drawing said flange portions toward one another to draw said tubular member closely around said end rings, a transverse gasket positioned between said opposed flange portions and extending transversely from the one annular recess of the tubular member to the other, said gasket being pressed into sealing engagement with said flange portion upon the drawing together of the latter, split annular gaskets positioned within said recess, split follower rings positioned adpacent said gaskets, and means for urging said follower rings against said annular gaskets to press said gaskets into sealing engagement with said tubular member and said end rings.

7. A pipe coupling comprising two end rings to be welded to the ends of the pipe sections to be coupled, said end rings having over the greater part of their lengths an outer diameter larger than that of the pipe and having an annular groove in their outer surface, a flexible tubular member split at one place transversely of its circumference and provided at its adjacent split ends with outwardly projecting cross bars with opposed surfaces, said tubular member at both sides being formed into a shape of channel cross section with uniform width providing two inwardly facing annular recesses, one of said cross bar surfaces having a transverse groove extending between said two channels, and the outer side of said channels having a plurality of apertures, said tubular member further having at its inner surface two spaced ring-like inward projections situated between said channels and adapted to engage said annular grooves for interlocking said tubular member and said end rings, said grooves having a greater width than said projections to allow some deflection between the end rings and the tubular member, a gasket positioned in said groove in said cross bar surface and extending transversely between said channels, means for drawing said flange portions toward one another to draw said tubular member around said end rings with minimum clearance, said gasket thereby being pressed into sealing engagement with the opposite surface of the other of said two cross bars, split annular gaskets positioned within said channels, split follower rings positioned within said channels adjacent said annular gaskets, and a plurality of set screws threadedly engaged in said apertures in said channel sides for urging said follower rings against said annular gaskets to press the latter into sealing engagement with said tubular member and said end rings.

8. A pipe coupling for coupling the ends of two pipe sections, said pipe ends having an annular groove in their outer surface, said coupling comprising a flexible tubular member split at one place transversely of its circumference, thus forming two opposed end portions, said tubular member at both of its sides being formed into a shape of channel cross section with uniform width providing two inwardly facing recesses, the outer side of said channels having a plurality of apertures, and said member further having at its inner surface two ring-like projections situated between said channels and adapted to engage said annular grooves for locking said pipe ends in said tubular member, means for drawing said end portions toward each other to draw said tubular member closely around said pipe ends, sealing means between said end portions to seal the split in said annular member when said end portions are drawn up, split annular gaskets positioned one within each channel and having an annular groove on one side, split follower rings positioned one within each channel adjacent said annular gasket, and a plurality of bolts threadedly engaged in said apertures in said channel sides to urge said follower rings against said gaskets to press the latter into sealing engagement with said annular member and said end rings, said follower rings having at one side an annular groove for receiving the abutting ends of said bolts and at the other side an annular projection fitting into said annular groove in said gaskets, each set of said bolts, follower ring and gasket thereby being inter-engaged to be retained in position before the application of the coupling.

9. A pipe coupling comprising a flexible tubular member split transversely of its circumference and provided at its adjacent split ends with outwardly projecting cross bars having opposed flat surfaces lying flush with said split ends, said tubular member having at both of its sides an inwardly facing annular recess and said cross bars having in their opposite surfaces at least two transverse grooves, one of which extends between said two annular recesses, said cross bars being provided with pairs of aligned tangential apertures, gusset portions on said tubular member extending backward over some distance from said cross bars, gaskets positioned in said transverse grooves, tangential bolts engaged in said pairs of apertures for drawing said flange portions toward one another to draw said tubular member closely around the pipe ends, and to press said gaskets into sealing engagement between the opposed surfaces of said cross bars, split annular gaskets positioned one in each of said annular recesses, and follower means for pressing said annular gaskets into sealing engagement with said tubular member and said pipe ends, the butt ends of at least one of said transverse gaskets thereby being pressed into sealing engagement with said two annular gaskets.

10. In a pipe coupling for large diameter pipe, a flexible tubular member split transversely of its circumference, outwardly-projecting flange portions provided at the split ends of said tubular member and having opposed faces, at least one of said faces being provided with a transverse groove, a strap-like gasket placed in said groove and having a thickness greater than the depth of the groove, and means for drawing said flange portions toward each other to draw said tubular member around the pipe and to press said gasket between said flange portions into sealing engagement with the opposed faces thereof to seal the split in said tubular member.

11. In a pipe coupling for large diameter pipe, a flexible tubular member split transversely of its circumference, outwardly projecting flange portions provided at the split end of said tubular member and having opposed faces, both of said faces being provided with at least two spaced transverse grooves, the grooves in the one face lying opposite the grooves in the opposite face, strap-like gaskets, one for each groove, and having a thickness greater than the depth of said grooves, a shim between said faces of said flange portions, and means for drawing said flange portions toward one another to draw said tubular member around the pipe and to press said gaskets into sealing engagement with the respective sides of said shim.

12. In a pipe coupling for large diameter pipe, a flexible tubular member split transversely of its circumference, outwardly projecting flange portions provided at the split end of said tubular member and having opposed faces, both of said faces being provided with at least two spaced transverse grooves, the grooves in the one face lying opposite the grooves in the opposite face, strap-like gaskets, one for each pair of opposed grooves and having a thickness greater than the combined depth of said pair of grooves, and means for drawing said flange portions toward one another to draw said tubular member around the pipe and to press each of said gaskets into sealing engagement with one of said pairs of opposed grooves.

ROGER E. RISLEY.
GEORGE D. KISH.

REFERENCES CITED

The following references are of record in the file of this patent:

UNITED STATES PATENTS

| Number | Name | Date |
|---|---|---|
| 783,944 | Frost | Feb. 28, 1905 |
| 1,071,235 | Hutton | Aug. 26, 1913 |
| 2,264,581 | Naylor | Dec. 2, 1941 |
| 2,445,151 | Newell | July 13, 1948 |